United States Patent
Weber et al.

(10) Patent No.: US 10,143,055 B2
(45) Date of Patent: Nov. 27, 2018

(54) ILLUMINATING DEVICE FOR VEHICLES

(71) Applicant: ZKW GROUP GMBH, Wieselburg (AT)

(72) Inventors: Emanuel Weber, Baden (AT); Gerald Fritz, Warth (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 15/578,439

(22) PCT Filed: May 30, 2016

(86) PCT No.: PCT/AT2016/050167
§ 371 (c)(1),
(2) Date: Nov. 30, 2017

(87) PCT Pub. No.: WO2016/191781
PCT Pub. Date: Dec. 8, 2016

(65) Prior Publication Data
US 2018/0177013 A1    Jun. 21, 2018

(30) Foreign Application Priority Data

Jun. 1, 2015 (AT) .................. A 50445/2015

(51) Int. Cl.
*H05B 33/08* (2006.01)
*F21S 41/141* (2018.01)
*F21Y 115/10* (2016.01)

(52) U.S. Cl.
CPC ........ *H05B 33/0851* (2013.01); *F21S 41/141* (2018.01); *H05B 33/083* (2013.01); *F21Y 2115/10* (2016.08)

(58) Field of Classification Search
CPC .......................... H05B 33/08; H05B 33/0812; H05B 33/0815; H05B 33/0842; H05B 33/0845;

(Continued)

(56) References Cited

U.S. PATENT DOCUMENTS

| 7,439,945 | B1 | 10/2008 | Await et al. |
| 7,741,788 | B2 | 6/2010 | Ito et al. |
| 8,154,222 | B2 * | 4/2012 | Korsunsky ......... H05B 33/0818 315/307 |

(Continued)

FOREIGN PATENT DOCUMENTS

| DE | 102004060483 A1 | 6/2006 |
| EP | 1318701 A2 | 6/2003 |

(Continued)

OTHER PUBLICATIONS

International Search Report for PCT/AT2016/050167, dated Jul. 20, 2016 (2 pages).

(Continued)

*Primary Examiner* — Jimmy Vu

(74) *Attorney, Agent, or Firm* — Eversheds Sutherland (US) LLP

(57) ABSTRACT

An illuminating device for vehicles which has at least one LED branch (Z1, Z2) with at least one LED ($D_{L11}$ ... $D_{L1n}$, $D_{L21}$ ... $D_{L2n}$), and with a controlled LED power supply (1) and a drive (3) which provides dimming signals ($S_{DA1}$, $S_{DA2}$; $S_{DD1}$, $S_{DD2}$) for the LEDs, wherein an electronic switch ($T_{S1}$, $T_{S2}$) is associated to the at least one LED branch (Z1, Z2) and is supplied with a PWM dimming signal ($S_{DD1}$, $S_{DD2}$), and the at least one LED branch is bridged for the purpose of branching off a partial current ($I_{N1}$, $I_{N2}$) from a controlled auxiliary circuit (N1, N2) having a current controller with an analog controller (2$_1$, $T_{N1}$, 2$_2$, $T_{N2}$) which is supplied with an analog dimming signal ($S_{DA1}$, $S_{DA2}$).

9 Claims, 3 Drawing Sheets

Figure 1:
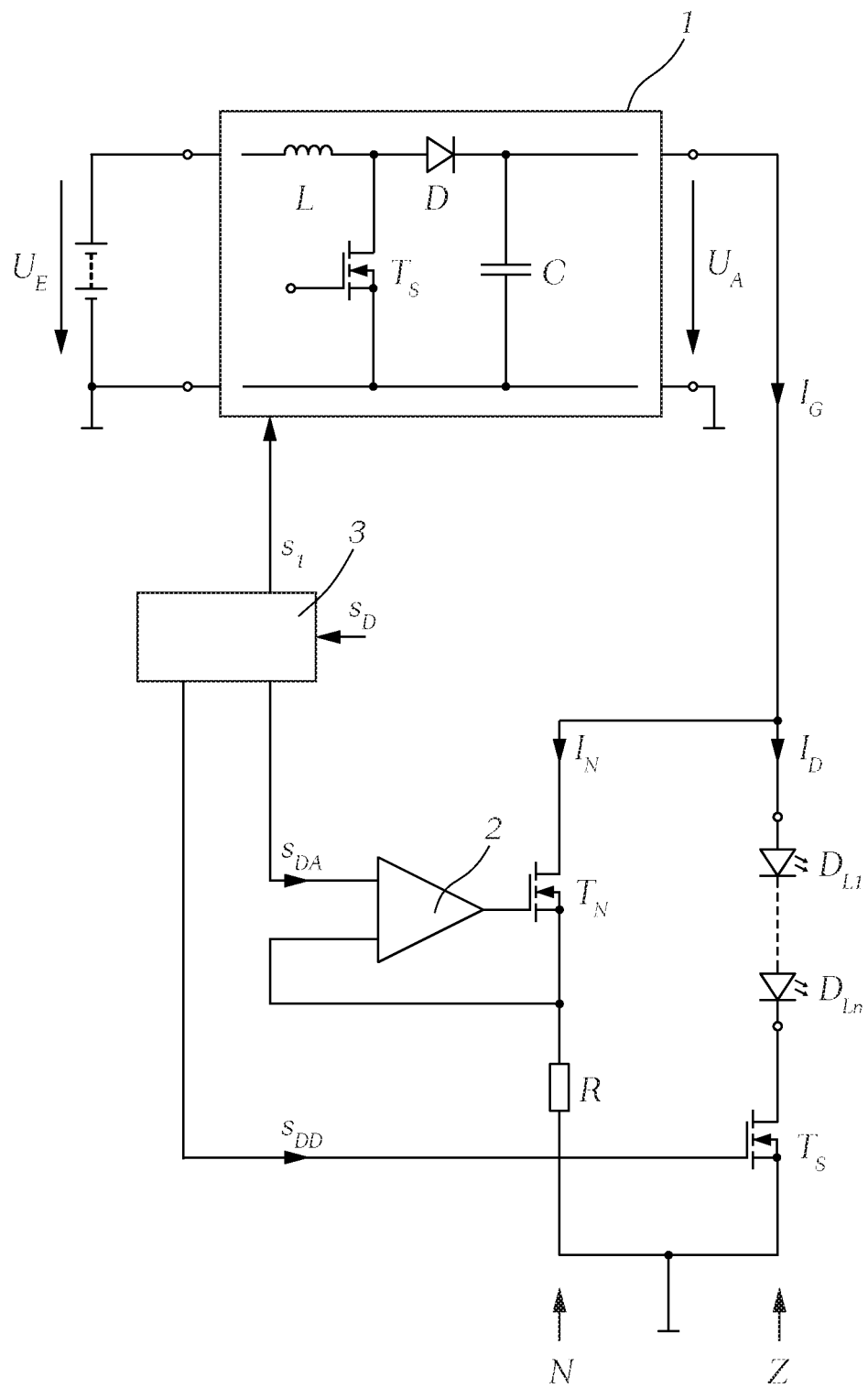

(58) Field of Classification Search
CPC . H05B 33/0851; H05B 33/083; F21S 41/141; F21S 2115/10
USPC .... 315/151–158, 185 R, 224–226, 291, 307, 315/308, 312
See application file for complete search history.

(56) References Cited

U.S. PATENT DOCUMENTS

| | | |
|---|---|---|
| 2011/0241549 A1 | 10/2011 | Wootton |
| 2013/0147381 A1 | 6/2013 | Yang |
| 2013/0207559 A1 | 8/2013 | Ferrier |
| 2013/0250215 A1* | 9/2013 | Sasaki ............... H05B 33/0815 349/69 |
| 2014/0085731 A1 | 3/2014 | Farris et al. |
| 2014/0168567 A1* | 6/2014 | Kikuchi ............. H05B 33/0815 349/61 |

FOREIGN PATENT DOCUMENTS

| | | |
|---|---|---|
| EP | 2670218 A1 | 12/2013 |
| EP | 2797386 A1 | 10/2014 |
| JP | 2006-261160 A | 9/2006 |
| JP | 2007-165001 A | 6/2007 |
| JP | 2012-099337 A | 5/2012 |
| WO | 2008/068682 A1 | 6/2008 |
| WO | 2011/024101 A1 | 3/2011 |
| WO | 2012/162203 A2 | 11/2012 |
| WO | 2014/087874 A1 | 6/2014 |

OTHER PUBLICATIONS

Search Report issued in Austrian Application No. A 50445/2015, completed Apr. 29, 2016 (1 page).

* cited by examiner

ILLUMINATING DEVICE FOR VEHICLES

The present invention refers an illuminating device for vehicles, which has at least one LED branch with at least one LED, as well as with a controlled LED power supply and a drive providing dimming signals for the LEDs.

By using LEDs as light sources for vehicle headlights and other illuminating devices on vehicles, such as blinking lights, the designers are offered new possibilities for designing the individual lighting functions. Besides the actual functions, the esthetic aspect of the design is increasingly taken into consideration. An essential detail is the optical transition between the commutation of two or more lighting functions. A "hard" activation or deactivation of a lighting function is substantially undesirable. Instead, the activation as well as the deactivation process are continuously provided via a ramp. A related problem is the start of an activation phase or the end of a deactivation phase, since at these time instants the LEDs and thus the irradiated light are dimmed to zero in very small steps.

Usually, this is performed by PWM-dimming of the lighting functions from 100% to 0% or from 0% to 100%. In particular in case of PWM-values lower than 10%, however, a visible flickering of the lighting functions takes place. In order to prevent such a flickering, which is unacceptable in practical use, particular measures have thus to be taken. A possible measure consists in performing an analog reduction of the current value through the power supply itself. The PWM-value (duty ratio) cannot be set below a certain threshold value, such as 10%, so that no visible flickering takes place. In this case it is absolutely necessary that the power supply performs the analog control of each individual LED current, although this means that for each LED or each LED branch a separate power supply is required, which may cause considerable effort.

An object of the invention is to provide an illuminating device, in which a flexible and easy flicker-free dimming of individual lighting functions is provided.

This object is achieved by an illuminating device of above said type, in which, according to the invention, an electronic switch is associated to the at least one LED branch and is supplied with a PWM dimming signal, and the at least one LED branch is bridged for the purpose of branching off a partial current from a controlled auxiliary circuit having a current controller with an analog controller which is supplied with an analog dimming signal.

With the invention a single controlled power supply may be used and even a plurality of series- and/or parallel connected LED branches or strings may be operated with an individually settable current. In particular, the invention allows a continuous dimming from 0% to 100% without any visible flickering of the light image.

A particularly lossless control may be provided if the electronic switch is series connected to the at least one LED branch.

On the other hand, in certain cases it may be advantageous, if at least two LED branches are parallel connected. In this case it is recommended to provide the controlled LED power supply as a source of constant voltage.

In advantageous and easily constructed variants it may be reasonable if the analog controller has an operational amplifier and a transistor, which is driven by the same.

It is also preferred if the analog controller is provided, as a control variable, with the signal, which is proportional to the current flowing through the at least one auxiliary circuit.

In other advantageous embodiments, it may be useful to provide a resistor subject to the branched current in the auxiliary circuit.

In certain cases, it may be convenient, if the electronic switch is connected in parallel to the at least one LED branch.

Figure 2:
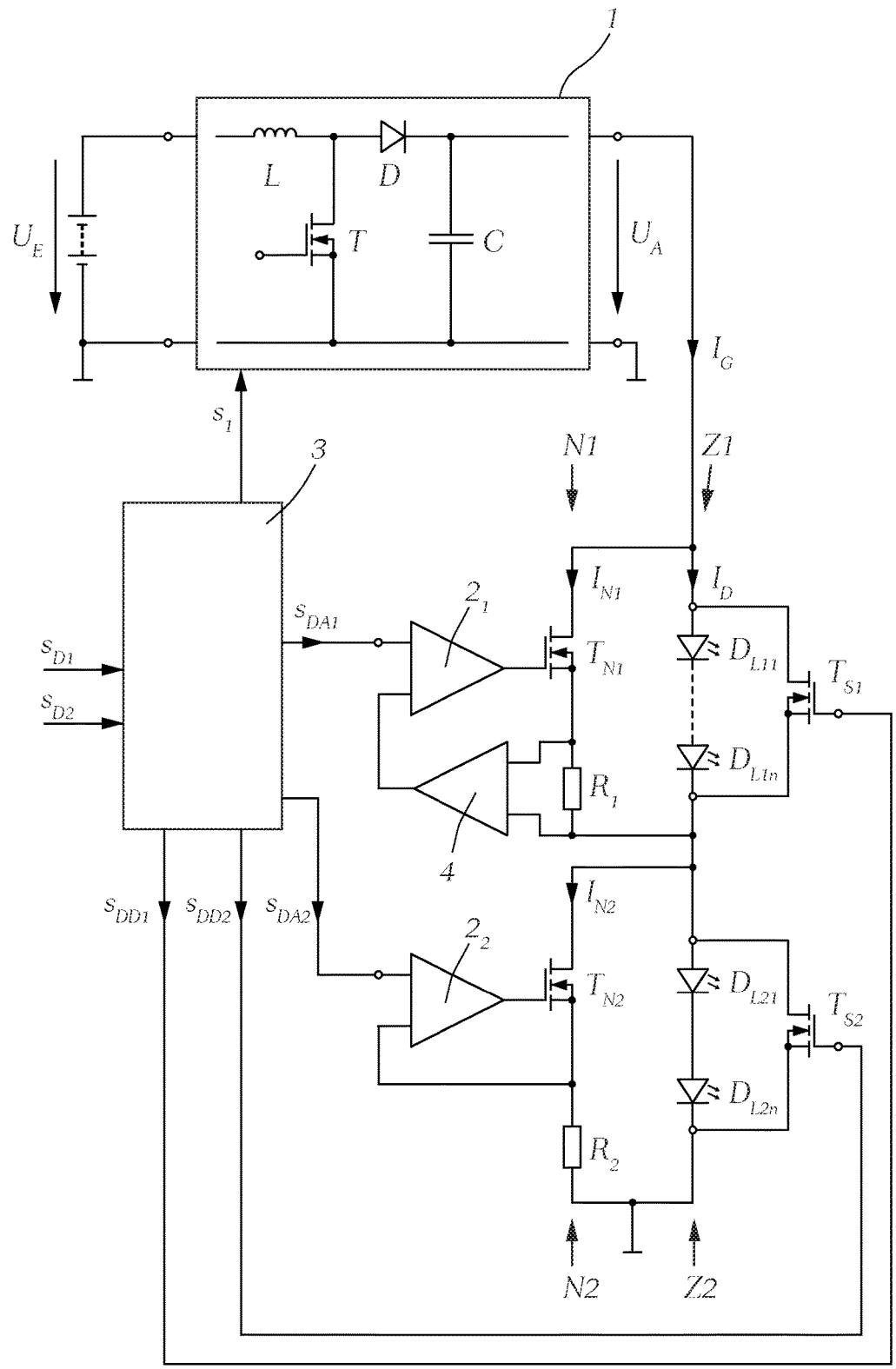
Figure 3:
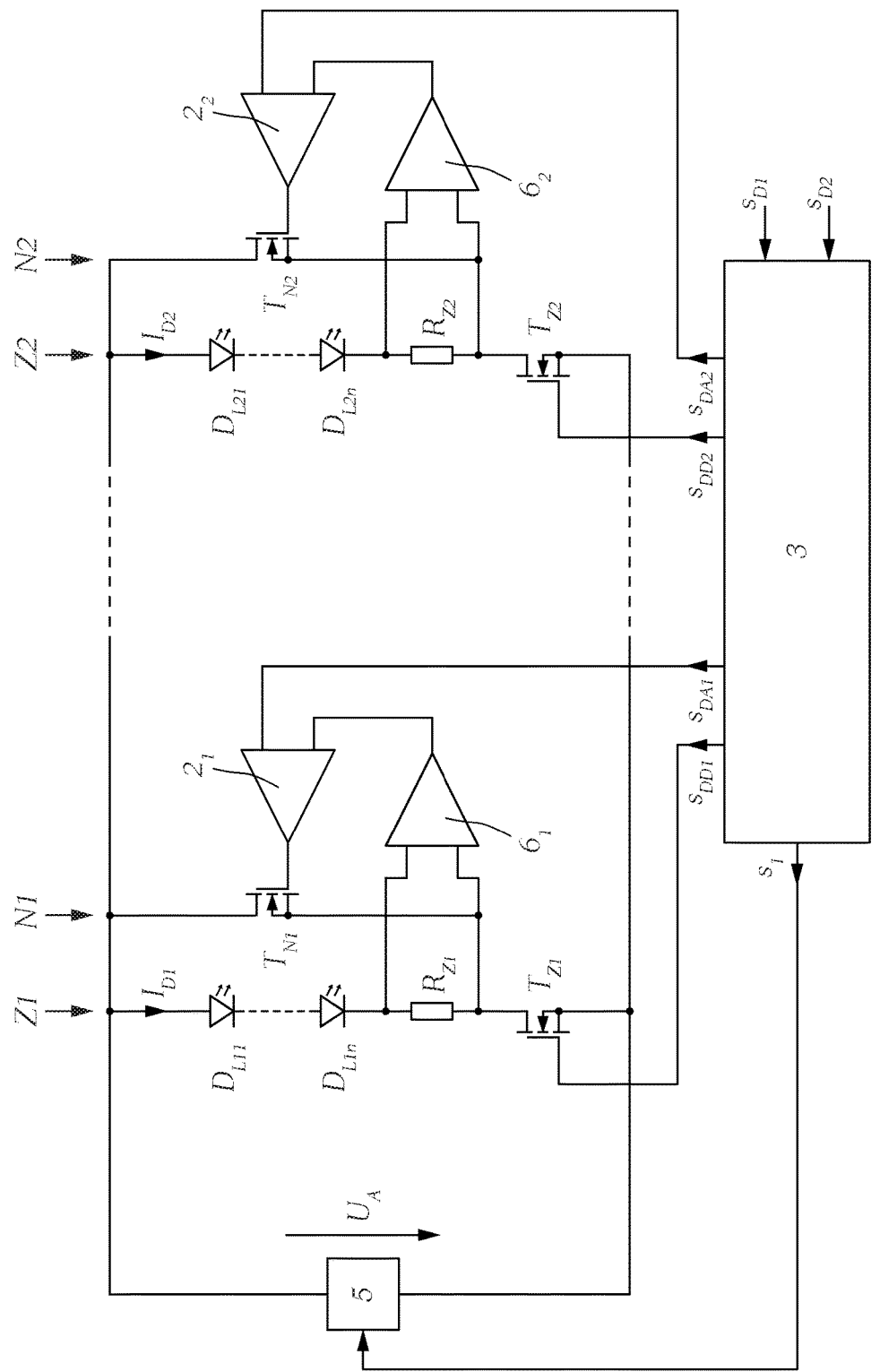

The invention together with further advantages is explained in the following by means of exemplary embodiments, which are shown in the drawings. In particular FIG. 1 shows a simplified circuit diagram for an inventive illuminating device in a first embodiment, FIG. 2 shows a second exemplary circuit diagram for an inventive illuminating device and FIG. 3 shows a third exemplary circuit diagram for an inventive illuminating device.

In FIG. 1, a controlled power supply 1 is shown, which, in the present case, is a step-up converter, wherein an inductance L, a switching transistor $T_S$, a diode D and a capacitor C are symbolically shown. This step-up converter or power supply 1 operates on an input voltage $U_E$, such as of a vehicle battery, and provides, in this case, a constant output current $I_G$, wherein a voltage $U_A$ is provided at the output of the power supply. This output current $I_G$ is supplied to a LED branch Z, which is provided with one or more LEDs $D_{L1} \ldots D_{Ln}$, and in which an electronic switch $T_S$, in general a switch transistor, is connected.

In parallel to the LED branch Z for branching a partial current $I_N$, a controlled auxiliary circuit N is provided, in this case comprised of a transistor $T_N$ and a resistor R, which is series connected to this transistor, wherein the transistor $T_N$ is driven by an operational amplifier 2. The operational amplifier 2 receives a control signal composed of the voltage drop on resistor R, which is proportional to current $I_N$, at one input, and at its other input an analog dimming signal $S_{OA}$, which is provided by a drive 3. This drive also provides a digital dimming signal $S_{DD}$ to the electronic switch, i.e. the transistor $T_S$. The drive 3 may optionally also provide a control signal si for controlling the power supply 1.

It can be seen that therefore, for dimming the LEDs $D_{L1} \ldots D_{Ln}$ two possibilities are provided, i.e., on one hand, through the electronic switch $T_S$, which is driven by a digital dimming signal $S_{DD}$, generally a PWM signal, and, on the other hand, through the current controller in the auxiliary circuit, i.e. the transistor $T_N$, which is driven and controlled by the operational amplifier 2, and which may branch off a partial current $I_N$ from the total current $I_G$.

The drive 3, which may also be provided with an external dimming signal $s_T$, thus operates in such a way that at higher dimming values and correspondingly high duty ratio, only the PWM determines the dimming, for example, between 100% and 10% duty cycle. In this operating condition, the transistor $T_N$ is not conducting and no auxiliary current $I_N$ is flowing, so that the current ID corresponds to total current $I_G$.

If, however a dimming below this value must occur, driving by PWM would generally cause a flickering of the light image, which is uncomfortable to the eye. According to the invention, at this point, the auxiliary circuit takes over the control or dimming function, in which it branches a partial current or auxiliary current $I_N$, so that, in this way, starting from a defined value, such as 10% of desired dimming value to 0% of an analog dimming takes place. This means that starting from a predetermined value, the duty cycle of PWM is not further reduced, and the branched current $I_N$ is converted into heat in transistor $T_N$. Since this conversion of electrical energy into heat takes place only with an already strongly reduced dimming level, it is essentially unnoticeable.

FIG. 2 shows a circuit similar to that of FIG. 1, wherein the same components are provided with the same references, wherein however this circuit is expanded with two dimmable series connected LED branches Z1 and Z2. Again, these branches are provided by a power supply 1 with a total current $I_G$, which flows through the first branch Z1 with LEDs $D_{L11} \ldots D_{L1n}$ and through the second series connected branch Z2 with LEDs $D_{L21} \ldots D_{L2n}$.

An auxiliary circuit N1, formed by a transistor $T_{N1}$, which is series connected to a sensor resistor $R_1$, is connected in parallel to the first branch Z1. The transistor T1 is driven by an operational amplifier $2_1$, which is provided at its first input with a digital dimming signal $S_{DA1}$. The second input of operational amplifier $2_1$ is provided with the output signal of a differential amplifier 4, both inputs of which are connected to resistor $R_1$, so that the operational amplifier is provided with a voltage corresponding to the branched current $I_{N1}$. The LED branch Z1, composed of the series connected LEDs $D_{L11} \ldots D_{L1n}$ is bridged by an electronic switch $T_{S1}$, generally a switch transistor, which receives a digital dimming signal $S_{DD1}$. It is to be noted that each LED branch, in the simplest case, may also contain only one single LED.

Regarding the second LED branch Z2, comprised of series connected LEDs $D_{L21} \ldots D_{L2n}$, with reference to its wirings, essentially the same holds true as for first branch Z1. The auxiliary circuit N2 also contains a transistor $T_{N2}$, which is series connected with a sensor resistor R2, although in this case no differential amplifier is required, as in the case of auxiliary circuit $N_1$, since the sensor resistor $R_2$ is connected to mass by a terminal, so that a signal corresponding to auxiliary current $I_{N2}$ may be directly provided from R2 to the second input of an operational amplifier $2_2$, which drives transistor $T_{N2}$. The drive 3 provides an analog dimming signal $S_{DA2}$ to the first input of operational amplifier $2_2$. Here the drive may also provide external dimming signals $S_{D1}$ and $S_{D2}$ for both LED branches Z1 and Z2 and also a control signal si to power supply 1.

The difference of embodiment of FIG. 1 with respect to FIG. 2 is that the transistors $T_{S1}$ and $T_{S2}$, which are driven by a PWM signal, are not series connected with a LED branch, in this case, but in parallel to each LED branch Z1, Z2. Since both branches are provided with a constant current, depending on the duty ratio, a portion of current flows through the parallel connected transistor $T_{S1}$ or $T_{S2}$, which however is generally selected in order to have a very low bulk resistance, so that, in this way, no noticeable additional losses take place. Here too the dimming takes place with PWM signals preferably in a range from 100% to 10%, in any case up to a range, which does not cause a flickering of LEDs in the sense of an unpleasant impression to the observer. Obviously, said lower value of the duty ratio may also differ from 10%, for instance also 15% or 20%. Starting from this threshold value to be defined, analog dimming takes place in both branches, wherein the function exactly corresponds to that already described in connection with FIG. 1. The advantage of this configuration of FIG. 2 is also that with a single power supply, providing, in this case, a constant current $I_G$, the object can be achieved, even if two or more LED branches have to be dimmed independently.

FIG. 3 shows a further embodiment of the invention, which corresponds, regarding the presence of two LED branches Z1 and Z2, with analog auxiliary branches N1 and N2, to that of FIG. 2, wherein for same or like components the same references are also used.

It is however to be noticed that in the embodiment of FIG. 3, both LED branches Z1 and Z2 are parallel connected, with LEDs $D_{L11} \ldots D_{L1n}$ and $D_{L21} \ldots D_{L2n}$ to a source 5 of constant voltage output $U_A$. In each branch Z1 or Z2, an electronic switch $T_{Z1}$ and $T_{Z2}$ is respectively series connected to the LEDs, as well as a sensor resistor $R_{Z1}$ and $R_{Z2}$, respectively. Each of the electronic switches $T_{Z1}$, $T_{Z2}$, is driven by a digital dimming signal $S_{DD1}$ and $S_{DD2}$, respectively, wherein these signals preferably are PWM signals and originate from drive 3, which may also be provided with additional dimming signals $S_{D1}$ and $S_{D2}$. The drive 3 may also provide a control signal si to the constant voltage source 5, which is here used as a controlled LED power supply.

Similar to the embodiment of FIG. 2, each LED branch Z1 and Z2 is bridged by a respective controlled auxiliary circuit N1 and N2, wherein these auxiliary circuits are respectively provided with a transistor $T_{N1}$, $T_{N2}$, which is controlled by an operational amplifier $2_1$, $2_2$. Each operational amplifier $2_1$, $2_2$ receives an analog dimming signal $S_{DA1}$ and $S_{DA2}$ from the drive 3, respectively, as well as a control signal from a differential amplifier 61 and 62, respectively, the input of which is provided with the voltage drop on sensor resistor $R_{Z1}$ and $R_{Z2}$, respectively. These voltage drops correspond respectively, to currents $I_{D1}$ and $I_{D2}$ through the LEDs of both LED branches Z1 and Z2.

It should be clear that, on one hand, more than two LED branches Z1, Z2 may be parallel connected to each other in the manner shown, and that, on the other hand, in each LED branch, two or more LEDs may be present, as long as the output voltage $U_A$ of the constant voltage source 5 is correspondingly dimensioned.

Also in this embodiment, in case of dimming starting from a given dimming level, which is for example equal to 10% and which lies at the "flickering threshold", a transition from a digital PWM dimming through series transistors $T_{Z1}$ and $T_{Z2}$ to an analog dimming through the auxiliary branches N1 and N2 takes place. The embodiment shown in FIG. 3 may then be advantageously used when the power required by LEDs is not excessive, wherein it has to be also considered that in the PWM mode, the analog auxiliary branch has to react very quickly, in order to avoid current peaks through the LEDs. The analog controller may in this case be integrated into the PWM control through the drive 3, and may be kept in a sample-and-hold-status during the PWM-Off-phase.

The invention claimed is:

1. An illuminating device for vehicles comprising:
    at least one LED branch (Z; Z1, Z2) with at least one LED (DL$_1$. . . .DL$_n$; $D_{L11}$. . . $D_{L1n}$, $D_{L21}$. . . $D_{L2n}$), and with a controlled LED power supply (1, 5);
    a driver (3) which provides dimming signals ($S_{DA}$, $S_{DD}$; $S_{DA1}$, $S_{DA2}$; $S_{DD1}$, $S_{DD2}$) for the LEDs;and
    an electronic switch ($T_s$; $T_{S1}$, $T_s$; $T_{S1}$, $T_{S2}$) associated with the at least one LED branch (Z; Z1, Z2), the electronic switch being supplied with a PWM dimming signal ($S_{DD}$; $S_{DD1}$, $S_{DD2}$),
    wherein the at least one LED branch is bridged for the purpose of branching off a partial current ($I_N$, $I_{N1}$, $I_{N2}$) from a controlled auxiliary circuit (N; N1, N2) having a current controller with an analog controller (2, $T_N$; $2_1$, $T_{N1}$, $2_2$, $T_{N2}$) which is supplied with an analog dimming signal ($S_{DA}$; $S_{DA1}$, $S_{DA2}$).

2. The illuminating device of claim 1, wherein the electronic switch ($T_s$; $T_{Z1}$, $T_{Z2}$) is series connected with the at least one LED branch (Z; Z1, Z2).

3. The illuminating device of claim 1, wherein at least two LED branches (Z; Z1, Z2) are connected in series.

4. The illuminating device of claim 1, wherein at least two LED branches (Z; Z1, Z2) are connected in parallel.

5. The illuminating device of claim 4, wherein the controlled LED power supply (5) is a constant voltage source.

6. The illuminating device of claim 1, wherein the analog controller has an operational amplifier (2; $2_1$, $2_2$) and a transistor ($T_N$; $T_{N1}$, $T_{N2}$) controlled by the same.

7. The illuminating device of claim 1, wherein the analog controller is provided, as a control variable, with a signal, which is proportional to the current ($I_N$) through the at least one auxiliary circuit (N; N1, N2).

8. The illuminating device of claim 1, wherein the auxiliary circuit (N; N1, N2) comprises a resistor (R; R1, R2) through which the branched current ($I_N$) flows.

9. The illuminating device of claim 1, wherein the electronic switch ($T_{S1}$, $T_{S2}$) is connected in parallel to the at least one LED branch (Z; Z1, Z2).

\* \* \* \* \*